(12) United States Patent
Foreman et al.

(10) Patent No.: US 7,620,921 B2
(45) Date of Patent: Nov. 17, 2009

(54) IC CHIP AT-FUNCTIONAL-SPEED TESTING WITH PROCESS COVERAGE EVALUATION

(75) Inventors: Eric A. Foreman, Fairfax, VT (US); Gary D. Grise, Colchester, VT (US); Peter A. Habitz, Hinesburg, VT (US); Vikram Iyengar, South Burlington, VT (US); David E. Lackey, Jericho, VT (US); Chandramouli Visweswariah, Croton-on-Hudson, NY (US); Jinjun Xiong, White Plains, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 11/741,164

(22) Filed: Apr. 27, 2007

(65) Prior Publication Data

US 2008/0270953 A1  Oct. 30, 2008

(51) Int. Cl.
G06F 17/50 (2006.01)
(52) U.S. Cl. .......................................................... 716/6
(58) Field of Classification Search ........................ None
See application file for complete search history.

(56) References Cited

U.S. PATENT DOCUMENTS

| | | | |
|---|---|---|---|
| 5,206,861 A | 4/1993 | Hannon et al. | |
| 5,226,048 A | 7/1993 | Bandali et al. | |
| 5,323,401 A | 6/1994 | Maston | |
| 5,497,381 A | 3/1996 | O'Donoghue et al. | |
| 5,539,652 A | 7/1996 | Tegethoff | |
| 5,651,012 A | 7/1997 | Jones, Jr. | |
| 6,065,145 A | 5/2000 | Bencivenga | |
| 6,134,689 A | 10/2000 | Mateja et al. | |
| 6,327,686 B1 | 12/2001 | Grundmann et al. | |
| 6,345,373 B1 | 2/2002 | Chakradhar et al. | |
| 7,039,845 B2 * | 5/2006 | Rearick et al. | 714/738 |
| 7,082,588 B2 | 7/2006 | Scheffer et al. | |
| 7,149,999 B2 * | 12/2006 | Kahng et al. | 716/19 |
| 7,231,565 B2 * | 6/2007 | Lin | 714/724 |
| 7,424,693 B2 * | 9/2008 | Alter et al. | 716/6 |
| 7,424,694 B2 * | 9/2008 | Ikeda | 716/6 |
| 2005/0066296 A1 | 3/2005 | Visweswariah | |
| 2007/0016833 A1 | 1/2007 | Lin | |
| 2007/0089076 A1 | 4/2007 | Amatangelo | |

(Continued)

OTHER PUBLICATIONS

Sato et al., "Evaluation of the Statistical Delay Quality Model," ASP-DAC 2005, IEEE, pp. 305-310.*

(Continued)

*Primary Examiner*—Leigh Marie Garbowski
(74) *Attorney, Agent, or Firm*—Ryan K. Simmons; Hoffman Warnick LLC (57) ABSTRACT

Methods, systems and program products for evaluating an IC chip are disclosed. In one embodiment, the method includes running a statistical static timing analysis (SSTA) of a full IC chip design; creating at-functional-speed test (AFST) robust paths for an IC chip, the created robust paths representing a non-comprehensive list of AFST robust paths for the IC chip; and re-running the SSTA with the SSTA delay model setup based on the created robust paths. A process coverage is calculated for evaluation from the SSTA runnings; and a particular IC chip is evaluated based on the process coverage.

30 Claims, 4 Drawing Sheets

U.S. PATENT DOCUMENTS

2007/0094626 A1    4/2007    Alter et al.

OTHER PUBLICATIONS

Vorisek, V. et al., "Improved Handling of False and Multicycle Paths in ATPG", Proceedings of the 24th IEEE VLSI Test Symposium (2006), 6 pages.

Krstic, A. et al., "Diagnosis of Delay Defects Using Statistical Timing Models", Proceedings of the 21st IEEE VLSI Test Symposium (2003), 6 pages.

Cook, S., "Rethinking test at 130 nanometers and below", http://www.eetimes.com/showArticle.jhtml? articleID=17408660, Sep. 12, 2003, 6 pages.

"Mentor Graphics Announces Improved Performance and Advanced At-Speed Capabilities in FastScan for Testing Nanometer Designs", http://www.mentor.com/producs/dft/news/improved-performance_fastscan.cfm, 2 pages.

Peng, Q. et al., "On the Guaranteed Failing and Working Frequencies in Path Delay Fault Analysis", Proceedings of the 16th IEEE Instrumentation and Measurement Technology Conf., Venice, May 24-26, (1999), pp. 1794-1799.

Sengupta, S., "Test Strategies for Nanometer Technologies", IEEE ITC International Test Conference (2004), p. 1421.

Liou, J. et al., "On Theoretical and Practical Considerations of Path Selection For Delay Fault Testing", IEEE/ACM International Conference on Computer Aided Design (2002), pp. 94-100.

Wang, L. et al., "Critical Path Selection for Delay Fault Testing Based Upon a Statistical Timing Model", IEEE Transactions on Computer-Aided Design of Integrated Circuits and Systems, vol. 23, No. 11, Nov. 2004, pp. 1550-1565.

Yang, K. et al., "On Statistical Correlation Based Path Selection for Timing Validation", https://www.gigscale.org/ pubs/709/TSA05-1.pdf, pp. 8-11, 2005 IEEE.

Savkar, Ad, "Random Delay Simulation", IBM Technical Disclosure Bulletin (Apr. 1977), pp. 4257-4258.

Lee W. Young, "PCT International Search Report," International Business Machines Corporation, Aug. 15, 2008, 3 pages.

* cited by examiner

IC CHIP AT-FUNCTIONAL-SPEED TESTING WITH PROCESS COVERAGE EVALUATION

BACKGROUND

1. Technical Field

The disclosure relates generally to integrated circuit (IC) chip evaluation, and more particularly, to IC chip evaluation using at-functional-speed testing with process coverage evaluation.

2. Background Art

At-functional-speed testing of integrated circuit (IC) chips is frequently used to verify the functionality and performance of product IC chips. During IC chip fabrication, process variations may alter how an IC chip functions and/or performs. Further, fabrication process parameters can vary drastically from one IC chip fabrication lot to another, and within a lot. In addition, operating conditions within an IC chip vary during operation. One challenge relative to at-functional-speed testing is that IC chips tested represent, or include, only a small sampling of the overall fabrication process and operation condition variations the IC chip might see. However, it is important for IC chip fabricators to understand performance of future IC chips regardless of the different variations. Each IC chip must function and perform at acceptable rates regardless of the variations. Therefore, the measurements attained during at-functional-speed testing must be accompanied by modeling of the IC chip with its variations, so that the effect of the variations on the specific IC chip can be accurately predicted. The results of the IC chips' at-functional-speed tests should guide the simulation and the simulation should guide the at-functional-speed testing. However, this functionality is not available in the prior art.

Testing the IC chips with varying operation conditions such as voltage and temperature can further improve the model accuracy (testing a chip while sweeping conditions like voltage and temperature is also called "shmooing"). Also, intentional fabrication process variations can further enhance the modeling accuracy (the intentional variations are created in stripes on the surface of the wafer, and this procedure is called "striping" of hardware). The varying voltage and temperature and intentional process variations validate the modeling methodology with the tested IC chip.

One approach to this problem is to apply at-functional-speed tests to the IC chip and then to compare the timing obtained with a static timing model using only a single worst case process point. Conventionally, the at-functional-speed tests applied are either functional tests, transition-fault tests or path tests based on static timing analysis prediction of the worst case paths. Other approaches include at-functional-speed robust path tests generated using a statistical timing model based on injection of random transition faults into the circuit of the IC chip. Some approaches also use the results of at-functional-speed test for diagnosis of random defects based on statistical timing. However, none of the current approaches identifies the amount of variation covered by a set of at-functional-speed test patterns, nor do they determine the quality of the at-functional-speed tests from a process coverage standpoint. In addition, current approaches do not correlate manufacturing testing results with timing model accuracy based on changes in voltage, frequency or temperature, or based on process variations.

SUMMARY

Methods, systems and program products for evaluating an IC chip are disclosed. In one embodiment, the method includes running a statistical static timing analysis (SSTA) of a full IC chip design; creating at-functional-speed test (AFST) robust paths for an IC chip, the created robust paths representing a non-comprehensive list of AFST robust paths for the IC chip; and re-running the SSTA with the SSTA delay model setup based on the created robust paths. A process coverage is calculated for evaluation from the SSTA runnings; and a particular IC chip is evaluated based on the process coverage.

A first aspect of the disclosure provides a method for evaluating an integrated circuit (IC) chip, the method comprising: running a statistical static timing analysis (SSTA) of a full IC chip design; creating at-functional-speed test (AFST) robust paths for an IC chip, the created robust paths representing a non-comprehensive list of AFST robust paths for the IC chip; re-running the SSTA with the SSTA delay model setup based on the created robust paths; calculating process coverage for evaluation from the SSTA runnings; and evaluating a particular IC chip based on the process coverage.

A second aspect of the disclosure provides a system for evaluating an integrated circuit (IC) chip, the system comprising: means for running a statistical static timing analysis (SSTA) of a full IC chip design; means for creating at-functional-speed test (AFST) robust paths for an IC chip, the created robust paths representing a non-comprehensive list of AFST robust paths for the IC chip; means for re-running the SSTA with the SSTA delay model setup based on the created robust paths; means for calculating process coverage for evaluation from the SSTA runnings; and means for evaluating a particular IC chip based on the process coverage.

A third aspect of the disclosure provides a program product stored on a computer-readable medium, which when executed, evaluates an integrated circuit (IC) chip, the program product comprising program code, which when executed, performs the following process: running a statistical static timing analysis (SSTA) of a full IC chip design; creating at-functional-speed test (AFST) robust paths for an IC chip, the created robust paths representing a non-comprehensive list of AFST robust paths for the IC chip; re-running the SSTA with the SSTA delay model setup based on the created robust paths; calculating process coverage for evaluation from the SSTA runnings; and evaluating a particular IC chip based on the process coverage.

A fourth aspect of the disclosure provides a method for evaluating an integrated circuit (IC) chip, the method comprising: creating at-functional-speed test (AFST) robust paths for an IC chip design; running a statistical static timing analysis (SSTA) of the created robust paths for the IC chip design to determine a process variation coverage of the created robust paths; re-creating the at-functional-speed test (AFST) robust paths for the IC chip design based on the SSTA of the created robust paths to improve process coverage of the robust paths for all process variations; and evaluating a particular IC chip having the IC chip design using the re-created robust paths.

A fifth aspect of the disclosure provides a computer-readable medium that includes computer program code to enable a computer infrastructure to evaluate an IC chip, the computer-readable medium comprising computer program code for performing the processes of the disclosure.

A sixth aspect of the disclosure provides a business method for evaluating an IC chip, the business method comprising managing a computer infrastructure that performs each of the processes of the disclosure; and receiving payment based on the managing.

A seventh aspect of the disclosure provides a method of generating a system for evaluating an IC chip, the method comprising: obtaining a computer infrastructure; and deploying means for performing each of the processes of the disclosure to the computer infrastructure.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure.

DETAILED DESCRIPTION

Figure 1:
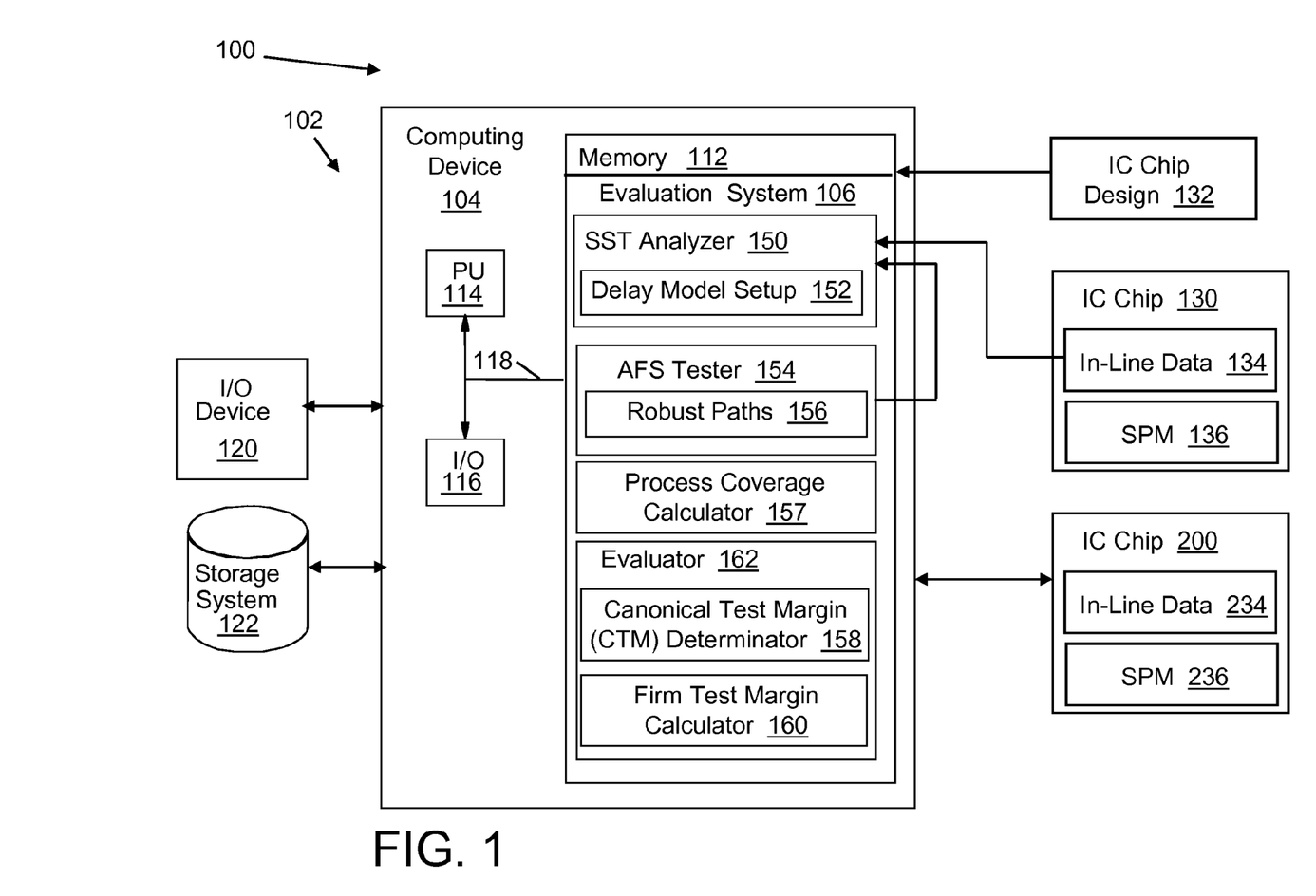
FIG. 1 shows a schematic diagram of embodiments of an evaluation system according to the disclosure.

Turning to the drawings, FIG. 1 shows an illustrative environment 100 for evaluating an integrated circuit (IC) chip 130. To this extent, environment 100 includes a computer infrastructure 102 that can perform the various process steps described herein for evaluating an IC chip. In particular, computer infrastructure 102 is shown including a computing device 104 that comprises an evaluation system 106, which enables computing device 104 to evaluate an IC chip by performing the process steps of the disclosure.

As shown, an IC chip design 132 is provided to evaluation system 106 for statistical evaluation. IC chip design 132 can be used to model how an IC chip 130 generated based on IC chip design 132 may perform. After fabrication, an actual IC chip 130 including in-line data 134 is evaluated by evaluation system 106. In-line data 134 may include process conditions under which IC chip 130 was manufactured (in a certain time frame) and measured performance data of IC chip 130. In-line data 134 can be used for, among other things, determining process conditions under which IC chip 130 was formed, performance data for IC chip 130 and a correlation between process conditions and performance. In-line data 134 can be obtained in a number of ways. In one embodiment, in-line data 134 is obtained from a statistical process monitor (SPM) 136 on IC chip 130. SPM 136 may include any macro or circuitry on IC chip 130 that records data, e.g., process conditions, performance, etc. The data measured by this SPM 136 on IC chip 130 is designed to contain the varied parameters used in a statistical static timing analysis (SSTA). It therefore allows adjustment of the chip timing delay formula to the specific IC chip 130. Collecting in-line data 134 over a wider range of IC chips manufactured also allows determining of a statistical distribution for the factory manufacturing these IC chips. This information then allows simulation of IC chip yield curves for the factory adjusted to the manufacturing capability demonstrated for IC chip design 132 under investigation. In another embodiment, in-line data 134 may be obtained from Kerf test data. Kerf test data is obtained from test circuits that are placed in the scribe lines between chips. These circuits are measured during a wafer test before the wafer is scribed or cut into individual chips. In addition, in-line data 134 may also be obtained from other sources not on IC chip 130, e.g., from wafer test or from ring oscillator measurements or from in-line electrical tests (ILETs).

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as evaluation system 106, that is stored in memory 112 and/or storage system 122. While executing computer program code, processor 114 can read and/or write data, such as IC chip robust path data, to/from memory 112, storage system 122, and/or I/O interface 116. Bus 118 provides a communications link between each of the components in computing device 104. I/O device 116 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and evaluation system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, evaluation system 106 enables computing infrastructure 102 to evaluate an IC chip 130. To this extent, evaluation system 106 is shown including a statistical static timing (SST) analyzer 150 including a delay model setup 152; an at-functional-speed (AFS) automatic test pattern (ATP) generator 154 including robust path data 156; a process coverage calculator 157; and an evaluator 162 including a canonical test margin determinator 158 and a firm test margin calculator 160. Operation of each of these functions is discussed further below. However, it is understood that some of the various functions shown in FIG. 1 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

Figure 2:
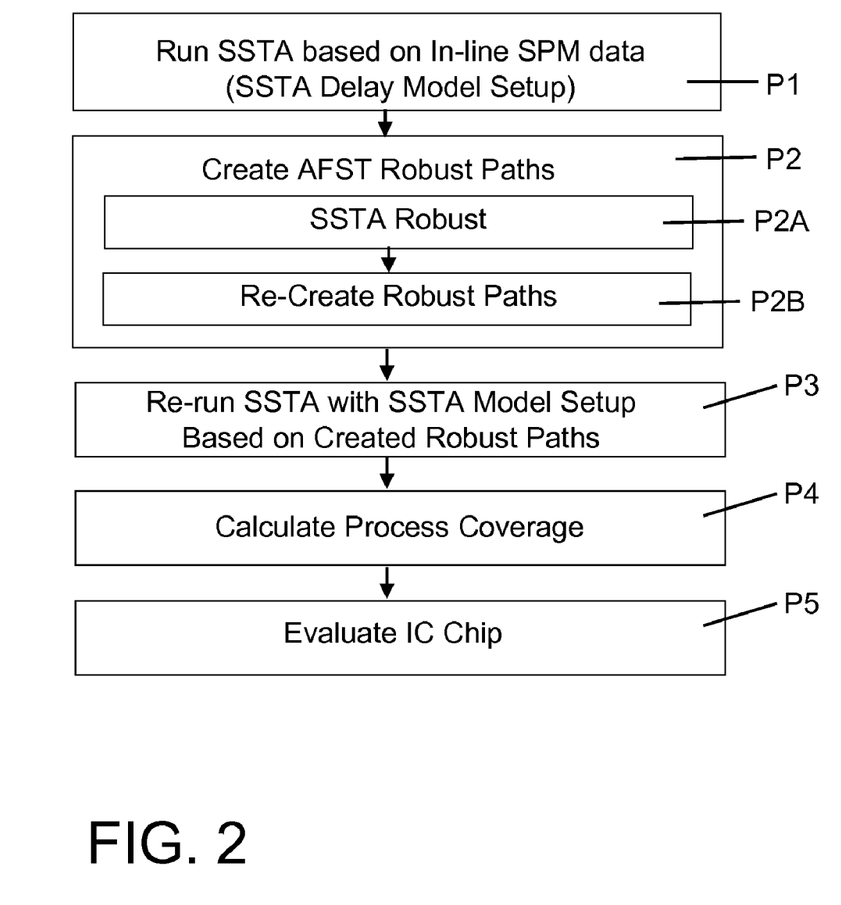
FIG. 2 shows a flow diagram of embodiments of an IC evaluation using the system of FIG. 1.
Figure 3:
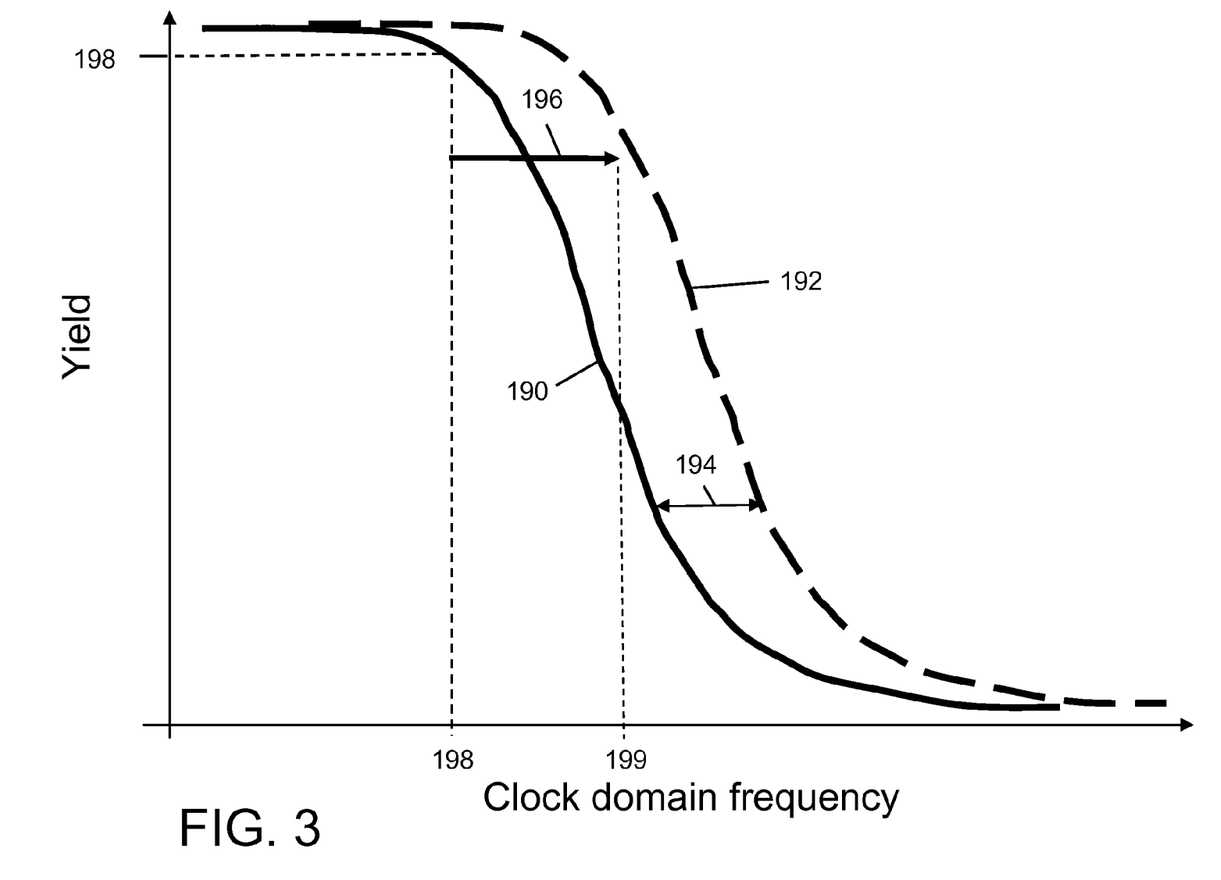
FIG. 3 shows a graphical representation of the IC chip evaluation of FIG. 2.

Turning to FIG. 2, and with continuing reference to FIG. 1, embodiments of a method for evaluating IC chip 130 will now be described. In process P1, SST analyzer 150 runs a statistical static timing analysis (SSTA) of full IC chip design 132. In one embodiment, SST analyzer 150 may use an SSTA delay model setup based on in-line data 134 to obtain a full chip target yield curve 190 (FIG. 3). This process is performed just once on the final IC chip design 132, irrespective of the number of IC chips 130 that are manufactured. The running may include obtaining in-line data 134 from SPM 136 or another source. Further, the running may include obtaining in-line data 134 from one of a particular IC chip 130 and from a lot, i.e., a number of IC chips 130. That is, in-line data 134 can be obtained for a specific IC chip design 132 and its performance distribution, or for many IC chip designs 132 to evaluate a large factory output.

SST analyzer 150 may include any now known or later developed systems for performing a statistical static timing analysis. For example, a first-order block-based statistical timing analysis is taught in C. Visweswariah, "System and Method for Statistical Timing Analysis of Digital Circuits," United States Patent Application Publication No. 2005-0066296, filed Sep. 18, 2003, and hereby incorporated in its entirety into this application. As understood, statistical static timing analysis (SSTA) computes the timing characteristics of a chip design as probability distributions. As taught in the patent application above, delays, arrival times and required times are expressed or computed in a form that is parameterized by the sources of variation. In the simplest form, these parameterized expressions are first-order linear combinations of random variables representing the sources of variation, and are called "canonical forms." SSTA computes actual arrival times, required arrival times and slacks or timing margins in canonical form. SSTA also predicts the so-called critical path, which is the longest delay in late mode, and the shortest delay in early mode. Due to parameter variations, the critical path is not unique, and different paths may be critical in different parts of the space of process variations. All paths through the circuit are implicitly covered in SSTA.

As noted above, delay model setup 152 is based on in-line data 134 during process P1. As noted above, in-line data 134 may be obtained from SPM 136, Kerf test data or other sources. In-line data 134 allows prediction of the timing characteristics of a particular IC chip 130 being evaluated, by applying specific values of the parameters measured from in-line data 134 or SPM 136 instead of the probability distributions used in SSTA.

FIG. 3 shows one illustrative full chip target yield curve 190, which communicates anticipated yield (i.e., the fraction of good IC chips) versus clock domain frequency (i.e., slack or, more accurately, performance). As indicated, the higher the clock domain frequency attained by IC chip design 132, the less the yield for that IC chip design 132. Full chip target yield curve 190 indicates the performance distribution of full IC chip design 132 (i.e., for the entire production volume when the volume is large enough to experience the full statistics of process variations) with all sorts of process parameter variations and how they impact clock domain frequency, i.e., timing.

In process P2, at-functional-speed (AFS) automatic test pattern (ATP) generator 154 creates at-functional-speed test (AFST) robust paths 156 (hereinafter "created robust paths") for IC chip design 132. This process is conducted just once irrespective of the number of chips manufactured. AFS ATP generator 154 may use any now known or later developed techniques for generating created robust paths 156 for IC chip design 132. Created robust paths 156 represent a non-comprehensive list, or subset, of AFST robust testable paths for IC chip 130. That is, created robust paths 156 are illustrative paths from an input latch to an output latch that can be tested on an actual IC chip 130 based on IC chip design 132.

In an alternative embodiment, in process P2A-B, SST analyzer 150 may be leveraged to ensure the criticality (testing quality) of created robust paths 156, i.e., to ensure that they represent the longest path between the input latch and output latch as much as possible. In this case, in process P2A, SST analyzer 150 may run an SSTA of created robust paths 156 for IC chip design 132 to determine, through process P4 described herein, process variation coverage of created test paths 156. SST analyzer 150 calculates the path delay as a function of all process parameters included in the analysis. This result shows how the different robust paths calculated compare in their criticality to fail for the highest possible clock speed. The most critical paths can be used and the less critical ones can be dropped. When the chip coverage is inadequate, e.g., it does not cover expected process variation ranges, in process P2B, AFS ATP generator 154 provides more critical test paths. Also, when the process variation coverage is inadequate, in process P2B, AFS ATP generator 154 may re-create the at-functional-speed test (AFST) robust paths 156 for IC chip design 132 based on the SSTA of the (initial) created robust paths to improve process coverage of the robust paths for all process variations.

In process P3, SST analyzer 150 re-runs a statistical static timing analysis (SSTA) for IC chip design 132 based on the created robust paths 156 (from process P2). In one embodiment, the re-running uses the same delay model setup 152 to obtain a yield curve 192 (FIG. 3) of created robust paths 156. Hence, yield curve 192 for created robust paths 156 is based on the created robust paths 156 that would be used to test an actual IC chip 130. That is, the same variations in process parameters are used, but not for a full chip—only for the subset of the chip comprising created robust paths 156 (i.e., thousands out of tens of millions of paths) that can be tested on AFS ATP generator 154 are considered. In one embodiment, the re-running includes calculating a performance distribution per clock domain (i.e., for each clock domain of IC chip 130) based on created robust paths 156. This is accomplished by SST analyzer 150 running SSTA on only created robust paths 156, i.e., the subset of robust paths, and pretending the remaining robust paths do not exist. As would be expected, yield curve 190 is shifted to the right in FIG. 3 because it does not consider all of the restrictions of the full IC chip, only parts of it. Accordingly, the yield and the clock domain frequency attainable show up as better than that for the full IC chip. Examples of differences that cause the shift may include: different voltages for each curve, non-consideration of aging parameters, coupling noise, and the choice of the subset of the circuit comprising robustly testable paths.

In process P4, process coverage calculator 157 calculates a process coverage for evaluation of IC chip 130 using SSTA runnings (process P1 and P3) with the parameter distribution either the same as delay model setup 152 or adjusted to manufacturing process data from this technology and factory. The results give IC chip 130 slack process distribution and the delay process distribution for created robust paths 156. The chip slack process distribution can be transferred into a yield curve. In one embodiment, the process coverage metric is defined as the probability of an IC chip meeting the targeted speed requirement while created robust paths 156 pass the at-functional-speed tests.

In process P5, evaluator 162 evaluates a particular IC chip 200 based on the process coverage. This evaluation can take a variety of forms.

Figure 4:
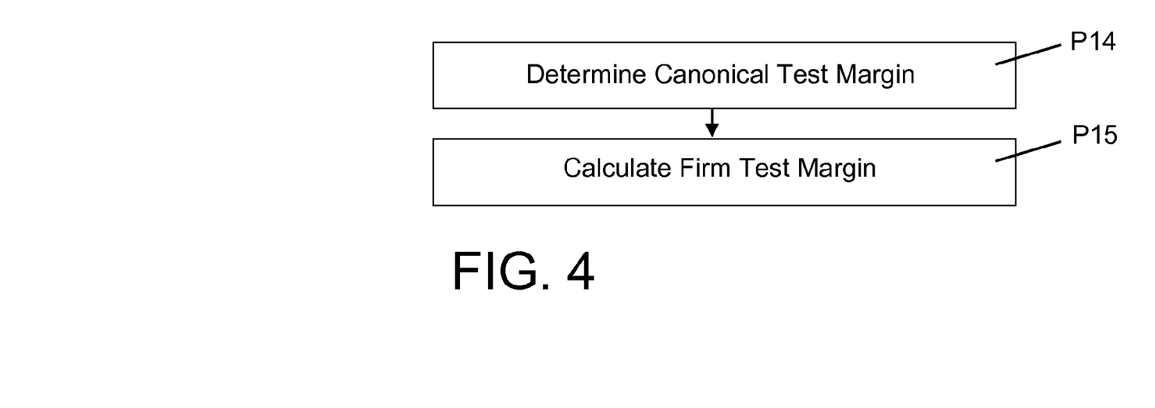
FIG. 4 shows a flow diagram of one embodiment of improving process coverage.

In one embodiment, returning to FIG. 3, line 194 indicates a difference between full chip target yield curve 190 and yield curve 192 for created robust paths 156. The length of line 194 is a function of process conditions, and represents a firm test margin 196 between AFS ATP generator 154 based simulation (i.e., curve 192 based on created robust paths 156) and full chip simulation (i.e., curve 190). In one embodiment, firm test margin 196 can be computed by minimizing unnecessary IC chip yield loss, i.e., the probability of a particular IC chip 200 meeting the customer-specified speed requirement but failing to pass the at-functional-speed test with firm test margin 196. That is, an IC chip 200 must test faster than curve 190 in order to pass, and firm test margin 196 tells one how much faster. One way to determine firm test margin 196, as shown by process P14 in FIG. 4, is to use the canonical test margin (CTM) determinator 158 to compute a canonical test margin (i.e., a function) parameterized to in-line data 134 and based on a difference between full chip target yield curve 190 and yield curve 192 of created robust paths 156. That is, CTM determinator 158 evaluates differences between curve 190 and curve 192 and states it as a function of all process parameters versus performance, which takes into account delay and sensitivity to process parameters and range. The process parameters may include, for example, voltage, channel length, temperature of testing, metal thickness, oxide thickness, transistor electrical parameters, etc.

Based on the canonical test margin, curve 190, and curve 192, in process P15 (FIG. 4), firm test margin calculator 160 calculates firm test margin 196. Firm test margin 196 can be determined the same for all IC chips or different for different IC chips by using in-line data 234 for a particular IC chip 200. As noted above, firm test margin 196 for evaluation can be an additional at-speed testing frequency (e.g., 5 MHz) on the tester for a particular IC chip 200. For example, when a particular IC chip 200 is tested, the clock domain frequency attained must exceed a target at-functional-speed performance requirement (i.e., line 198) by firm test margin 196. In other words, particular IC chip 200 must exceed the target clock domain frequency of, for example, 300 MHz, by 5 MHz, in order to pass. In this case, the evaluating includes adding chip specific, firm test margin 196 to target at-functional-speed performance requirement 198 for particular IC chip 200. One simplified example of this embodiment may have a particular IC chip 200 to be evaluated using a voltage of 10 mV, a channel length of 200 nm and a testing temperature of 100° C. These values may be plugged into the canonical test margin, and through process P15, a firm test margin 196 may be obtained of, for example, 5 MHz. In an alternative embodiment, the firm test margin for evaluation can be a voltage-specific (or any other testing condition specific) testing environment, i.e., all chips will be evaluated at the same clock frequency but at different chip-specific voltages.

In another embodiment, firm test margin 196 can be computed to minimize shipped-product-quality-loss (SPQL), i.e., the probability of IC chips shipped to customers that fail to meet the customer-specified speed requirement, conditioned upon all shipped IC chips having passed at-functional-speed tests with firm test margin 196. In this embodiment, firm test margin 196 is set to a larger sigma (i.e., standard deviation) value than the original SSTA run (process P1) used for the chip yield analysis would mandate. Firm test margin 196, for example, can be expressed at a 5sigma point of the probability distribution function. The chip SSTA timing on the other hand was performed to a manufacturing yield target, cutting off the tail of the distribution for performance. In this way, firm test margin 196 in FIG. 3 is larger than the difference between full chip target yield curve 190 and a yield curve 192 of created robust paths 156. This guarantees an additional improvement in SPQL without changing the modeled chip at-functional-speed performance requirement (i.e., line 198).

In another embodiment, the evaluation may include performing a model to hardware (i.e., IC chip 130) correlation. In this case, the manufacturing chip test will be performed with changing test frequency until a failure of each created robust path 156 can be observed. Then, the further increase of the testing frequency will lead to the failure frequency of all robust paths. This chip performance data is then compared with new specially simulated delay data of these critical paths. This simulation may use a single process corner defined by in-line data 134 taken from SPM 136 on an IC chip 130 measured. A process corner is defined as a specific value of all process parameters in the simulation. Comparing the measured delays with the simulated delays gives an understanding of the accuracy of the models. Correlation and regression of the results of many paths further pinpoints the parameter which correlates the least with hardware. This can therefore also be seen as diagnostic tool for the hardware comparison.

The above-described methods may be performed for each clock domain of a particular IC chip 200. That is, each particular IC chip 200 may include any number of clock domains within its structure. Each clock domain represents its own particular process parameter issues, and hence, the method may be repeated for each clock domain.

Figure 5:
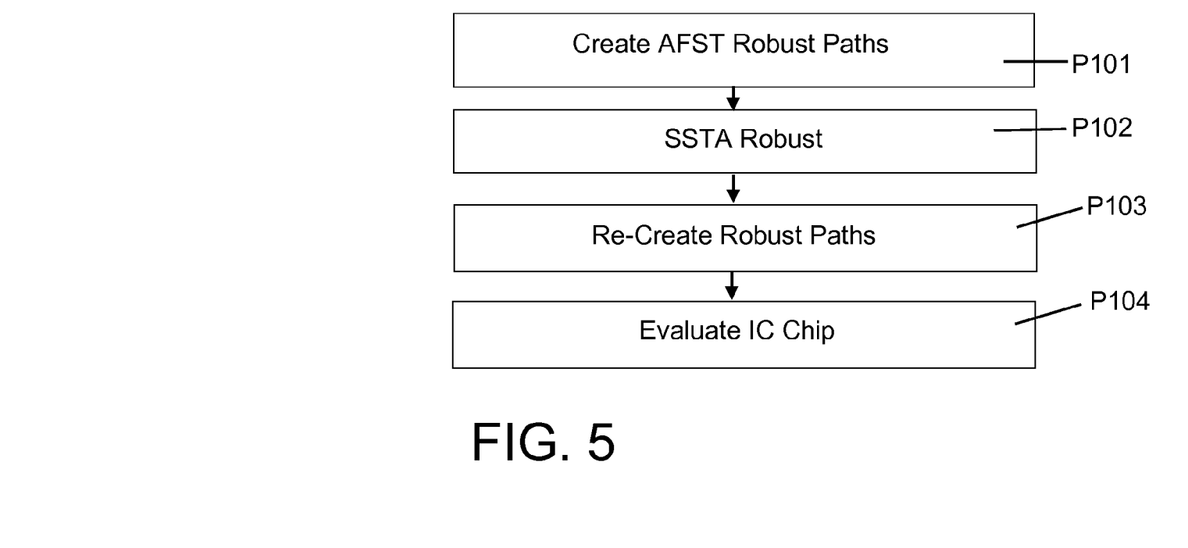
FIG. 5 shows a flow diagram of an alternative embodiment of an IC evaluation using parts of the system of FIG. 1.

Turning to FIG. 5, in another embodiment, a method for evaluating an IC chip 130 may include part of the above-described embodiments. In this case, in process P101, AFS ATP generator 154 creates at-functional-speed test (AFST) robust paths 156 for IC chip design 132. In process P102, SST analyzer 150 runs an SSTA of created robust paths 156 for IC chip design 132 to determine a process variation coverage metric of the created robust paths, which for example can be related to either the targeted SPQL or the unnecessary yield loss, or a combination of both. In process P103, AFS ATP generator 154 re-creates the at-functional-speed test (AFST) robust paths 156 for IC chip design 132 based on the SSTA of the (initial) created robust paths to improve process coverage of the robust paths for all process variations. In process P104, evaluator 162 evaluates a particular IC chip 200 having IC chip design 132 using the re-created robust paths.

As discussed herein, various systems and components are described as "obtaining" data (e.g., in-line data 134 via AFS ATP generator 154, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

While shown and described herein as a method and system for evaluating an IC chip, it is understood that the disclosure further provides various alternative embodiments. That is, the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc. In one embodiment, the disclosure can take the form of a computer program product accessible from a computer-usable or computer-readable medium providing program code for use by or in connection with a computer or any instruction execution system, which when executed, enables a computer infrastructure to evaluate an IC chip. For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, such as memory 122, magnetic tape, a removable computer diskette, a random access memory (RAM), a read-only memory (ROM), a tape, a rigid magnetic disk and an optical disk. Current examples of optical disks include compact disk —read only memory (CD-ROM), compact disk— read/write (CD-R/W) and DVD.

A data processing system suitable for storing and/or executing program code will include at least one processing unit 114 coupled directly or indirectly to memory elements through a system bus 118. The memory elements can include local memory, e.g., memory 112, employed during actual execution of the program code, bulk storage (e.g., storage system 122), and cache memories which provide temporary storage of at least some program code in order to reduce the number of times code must be retrieved from bulk storage during execution.

In another embodiment, the disclosure provides a method of generating a system for evaluating an IC chip. In this case, a computer infrastructure, such as computer infrastructure 102 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 104 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the disclosure.

In still another embodiment, the disclosure provides a business method that performs the process described herein on a subscription, advertising, and/or fee basis. That is, a service provider, such as an application service provider, could offer to evaluate an IC chip as described herein. In this case, the service provider can manage (e.g., create, maintain, support, etc.) a computer infrastructure, such as computer infrastructure 102 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person skilled in the art are intended to be included within the scope of the disclosure as defined by the accompanying claims.

What is claimed is:

1. A method for evaluating an integrated circuit (IC) chip, the method comprising:

running a statistical static timing analysis (SSTA) of a full IC chip design on at least one computing device, wherein the running the SSTA includes computing timing characteristics of the full IC chip design as probability distributions;

creating at-functional-speed test (AFST) robust paths for an IC chip on at least one computing device, the created robust paths representing a non-comprehensive list of AFST robust paths for the IC chip;

re-running the SSTA with an SSTA delay model setup based on the created robust paths on at least one computing device;

calculating process coverage for evaluation from the SSTA runnings on at least one computing device; and evaluating a particular IC chip based on the process coverage on at least one computing device.

2. The method of claim 1, further comprising performing the method for each clock domain of the particular IC chip.

3. The method of claim 1, wherein the running uses an SSTA delay model setup based on in-line data to obtain a full chip target yield curve, and the re-running uses the SSTA delay model setup based on the created robust paths to obtain a yield curve of the created robust paths.

4. The method of claim 3, wherein the evaluating includes:

determining a canonical test margin parameterized to the in-line data and based on a difference between the full chip target yield curve and the yield curve of the robust paths;

calculating a firm test margin for a particular IC chip from the canonical test margin, the full chip target yield curve and the yield curve based on the in-line data for the particular IC chip; and evaluating the particular IC chip using the firm test margin.

5. The method of claim 4, wherein the evaluating includes adding the firm test margin to a target at-speed performance requirement for the particular IC chip.

6. The method of claim 4, wherein the running includes obtaining the in-line data from a statistical process monitor (SPM) on an IC chip.

7. The method of claim 6, wherein the running includes obtaining the in-line SPM data from one of the particular IC chip and from a lot.

8. The method of claim 4, further comprising determining a test voltage as a function of the firm test margin, and using the test voltage for the evaluating.

9. The method of claim 3, wherein the in-line data includes process conditions under which the IC chip was manufactured and performance data for the IC chip.

10. The method of claim 3, wherein the re-running includes calculating a performance distribution per clock domain based on the created AFST robust paths.

11. The method of claim 1, further comprising re-creating the created robust paths for the IC chip design based on the SSTA of the created robust paths to improve process coverage of the created robust paths for all process variations.

12. A system for evaluating an integrated circuit (IC) chip, the system comprising:
- means for running a statistical static timing analysis (SSTA) of a full IC chip design, wherein the running the SSTA includes computing timing characteristics of the full IC chip design as probability distributions;
- means for creating at-functional-speed test (AFST) robust paths for an IC chip, the created robust paths representing a non-comprehensive list of AFST robust paths for the IC chip;
- means for re-running the SSTA with a SSTA delay model setup based on the created robust paths;
- means for calculating process coverage for evaluation from the SSTA runnings; and
- means for evaluating a particular IC chip based on the process coverage.

13. The system of claim 12, wherein each clock domain of the particular IC chip is evaluated.

14. The system of claim 13, wherein the re-running means calculates a performance distribution per clock domain based on the created AFST robust paths.

15. The system of claim 12, wherein the running means uses an SSTA delay model setup based on in-line data to obtain a full chip target yield curve, and
the re-running means uses the SSTA delay model setup based on the created robust paths to obtain a yield curve of the created robust paths.

16. The system of claim 15, wherein the evaluating means includes:
- means for determining a canonical test margin parameterized to the in-line data and based on a difference between the full chip target yield curve and the yield curve of the robust paths;
- means for calculating a firm test margin for a particular IC chip from the canonical test margin, the full chip target yield curve and the yield curve based on the in-line data for the particular IC chip; and
- wherein the evaluating means evaluates the particular IC chip using the firm test margin.

17. The system of claim 16, wherein the evaluating means adds the firm test margin to a target at-speed performance requirement for the particular IC chip.

18. The system of claim 16, wherein the running includes obtaining the in-line data from a statistical process monitor (SPM) on an IC chip.

19. The system of claim 18, wherein the running means obtains the in-line SPM data from one of the particular IC chip and from a lot.

20. The system of claim 16, wherein the determining means further determines a test voltage as a function of the firm test margin, and the evaluating means uses the test voltage for the evaluating.

21. The system of claim 15, wherein the in-line data includes process conditions under which the IC chip was manufactured and performance data for the IC chip.

22. The system of claim 12, wherein the creating means re-creates the created robust paths for the IC chip design based on the SSTA of the created robust paths to improve process coverage of the created robust paths for all process variations.

23. A program product stored on a computer-readable medium, which when executed, evaluates an integrated circuit (IC) chip, the program product comprising program code, which when executed, performs the following process:
- running a statistical static timing analysis (SSTA) of a full IC chip design, wherein the running the SSTA includes computing timing characteristics of the full IC chip design as probability distributions;
- creating at-functional-speed test (AFST) robust paths for an IC chip, the created robust paths representing a non-comprehensive list of AFST robust paths for the IC chip;
- re-running the SSTA with a SSTA delay model setup based on the created robust paths;
- calculating process coverage for evaluation from the SSTA runnings; and
- evaluating a particular IC chip based on the process coverage.

24. The program product of claim 23, wherein the running program code uses an SSTA delay model setup based on in-line data to obtain a full chip target yield curve, and
the re-running program code uses the SSTA delay model setup based on the created robust paths to obtain a yield curve of the created robust paths.

25. The program product of claim 24, wherein the evaluating program code performs the following:
- determining a canonical test margin parameterized to the in-line data and based on a difference between the full chip target yield curve and the yield curve of the robust paths;
- calculating a firm test margin for a particular IC chip from the canonical test margin, the full chip target yield curve and the yield curve based on the in-line data for the particular IC chip; and
- wherein the evaluating includes evaluating the particular IC chip using the firm test margin.

26. The program product of claim 25, wherein the evaluating program code adds the firm test margin to a target at-speed performance requirement for the particular IC chip.

27. The program product of claim 25, wherein the running includes obtaining the in-line data from a statistical process monitor (SPM) on an IC chip.

28. The program product of claim 27, wherein the running program code obtains the in-line SPM data from one of the particular IC chip and from a lot.

29. The program product of claim 23, wherein the creating program code re-creates the created robust paths for the IC chip design based on the SSTA of the created robust paths to improve process coverage of the created robust paths for all process variations.

30. A method for evaluating an integrated circuit (IC) chip, the method comprising:
- creating at-functional-speed test (AFST) robust paths for an IC chip design on at least one computing device;

running a statistical static timing analysis (SSTA) of the created robust paths for the IC chip design on at least one computing device to determine a process variation coverage of the created robust paths, wherein the running the SSTA includes computing timing characteristics of the IC chip design as probability distributions;

re-creating the at-functional-speed test (AFST) robust paths for the IC chip design based on the SSTA of the created robust paths on at least one computing device to improve process coverage of the robust paths for all process variations; and evaluating a particular IC chip having the IC chip design using the re-created robust paths on at least one computing device.

* * * * *